United States Patent [19]
Goto et al.

[11] Patent Number: 5,603,067
[45] Date of Patent: Feb. 11, 1997

[54] CAMERA

[75] Inventors: Shigenori Goto; Tatsuo Saito; Shiro Hashimoto, all of Oomiya, Japan

[73] Assignee: Fuji Photo Optical Co. Ltd, Oomiya, Japan

[21] Appl. No.: 355,050

[22] Filed: Dec. 13, 1994

[30] Foreign Application Priority Data

Dec. 16, 1993  [JP]  Japan .................................. 5-316823

[51] Int. Cl.$^6$ ............................ G03B 7/00; G03B 17/02; G03B 17/26
[52] U.S. Cl. ........................ 396/210; 396/536; 396/511; 396/514
[58] Field of Search ...................... 354/21, 288, 276–281

[56] References Cited

U.S. PATENT DOCUMENTS

| 3,601,021 | 8/1971 | Easterly ..................................... 354/21 |
| 4,085,410 | 4/1978 | Maeda et al. ............................. 354/21 |
| 5,109,241 | 4/1992 | Keeney ..................................... 354/21 |

FOREIGN PATENT DOCUMENTS

| 54-115129 | 9/1979 | Japan . |
| 4-340945 | 11/1992 | Japan . |
| 6-273828 | 9/1994 | Japan . |

*Primary Examiner*—Safet Metjahic
*Assistant Examiner*—John Chizmar
*Attorney, Agent, or Firm*—Hickman Beyer & Weaver

[57] ABSTRACT

A camera is of a type using the 120 size of roll film or the 220 size of roll film, which is so arranged that the height of a pressure plate on a back lid is changed over depending upon a type of a used film. A reflection-type photosensor is provided in the camera body, whereby a state of a lock mechanism of the back lid is detected. A second reflective plate is mounted on the pressure plate, and the second reflective plate reflects light from the photosensor when the back lid is in a lock state. A reflecting position where the light from the photosensor impinges is changed between reflective portions depending upon the height of the pressure plate. Since reflectivities of these reflective portions are different from each other, the height of the pressure plate, that is, the type of the used film can be determined by analyzing an output from the photosensor receiving the reflected light from the second reflective plate.

5 Claims, 4 Drawing Sheets

CAMERA

BACKGROUND OF THE INVENTION

1. Field of the Invention

The present invention relates to a camera using a so-called Brownie film, particularly a 120 size of roll film or a 220 size of roll film.

2. Related Background Art

The Brownie film is a popular name of roll film having 6 cm width, which are generally known as the 120 size of roll film and the 220 size of roll film. The 120 size of roll film is a film with backing paper stuck thereto. On the other hand, the 220 size of roll film is a film without backing paper but only with leader paper and trailer paper, and a film length thereof is double that of the 120 size of roll film.

For cameras using such 120 size of roll film and 220 size of roll film, the pressure of a pressure plate attached to a back lid is generally adjusted by changing a position of the pressure plate (a height to the back lid) because of a difference in thickness between the films.

In addition, because the number of frames to be taken is different between the 120 size of roll film and the 220 size of roll film, an initial setting value of a counter needs to be changed over to a count maximum number according to a film used.

Therefore, the conventional cameras are provided with a mechanism for changing over the height of the pressure plate and a counter changeover switch for changing over the count maximum number.

SUMMARY OF THE INVENTION

The conventional cameras as described above, however, force a user to perform two operations of the changeover of the height of the pressure plate and the changeover of the counter whenever the type of used film is changed, which requires much time and labor and which involves a possibility that the user forgets to perform either one of the operations.

Also, there is a demand to reduce the number of switch systems as much as possible.

It is, therefore, an object of the present invention to provide film-type-determining means which can determine a type of used film only with operations of changing over the height of the pressure plate and closing the back lid, and counter changeover means for automatically changing over the count maximum number depending upon the determined type.

A camera according to the present invention is a camera using either one of the 120 size of roll film and the 220 size of roll film, which has a pressure plate mounted to a back lid so that the height thereof to the back lid can be changed over depending upon a type of a used roll film, and a lock mechanism provided in the camera body, for locking the back lid in a closed state.

Further, this camera comprises a reflection-type photosensor provided in the camera body; a first reflective plate provided on a movable portion in the lock mechanism, which is arranged so that when the lock mechanism is in an unlock state, the first reflective plate reflects light projected from a light-emitting portion of the photosensor, toward a light-receiving portion of the photosensor and so that when the lock mechanism is in a lock state, the first reflective plate lets the light projected from the light-emitting portion of the photosensor travel straight; a second reflective plate having first and second reflective portions with respective reflectivities different from each other and from a reflectivity of the first reflective plate, which is mounted on the pressure plate so that when the back lid is closed and the lock mechanism is in the lock state, the second reflective plate reflects the light projected from the light-emitting portion of the photosensor, toward the light-receiving portion of the photosensor and which is arranged so that a portion for reflecting the light from the photosensor is changed over between said first and second reflective portions in synchronization with changeover of the height of the pressure plate; detecting means for detecting the height of the pressure plate and an open or close state of the back lid in accordance with an output from the photosensor; and determining means for determining a type of a used roll film from a result of detection by the detecting means.

In the above arrangement, the intensity of light received by the light-receiving portion of the photosensor changes depending upon the open or close state of the back lid and the height of the pressure plate. Namely, when the back lid is open and the lock mechanism is in the unlock state, the light-receiving portion of the photosensor receives the reflected light from the first reflective plate. When the back lid is closed and the lock mechanism is in the lock state, the light-receiving portion of the photosensor receives the reflected light from the first or second reflective portion in the second reflective plate. The reflective portions in the second reflective plate are changed over from one to the other depending upon the height of the pressure plate. Since the reflectivity of the first reflective plate and the reflectivities of the first and second reflective portions in the second reflective plate are different from each other, the level of output from the photosensor differs depending upon the intensity of reflected light. Accordingly, detecting the output from the photosensor, the open or close state of the back lid and the height of the pressure plate can be detected and the type of a used film can be presumed from the height of the pressure plate.

According to another aspect of the present invention, this camera further comprises a counter for counting a number of taken frames, and means for setting in the counter the count maximum number according to the type of the roll film determined by the determining means. In this case, the count maximum number of the counter is automatically changed over based on the type of the roll film.

DESCRIPTION OF THE PREFERRED EMBODIMENTS

Figure 1:
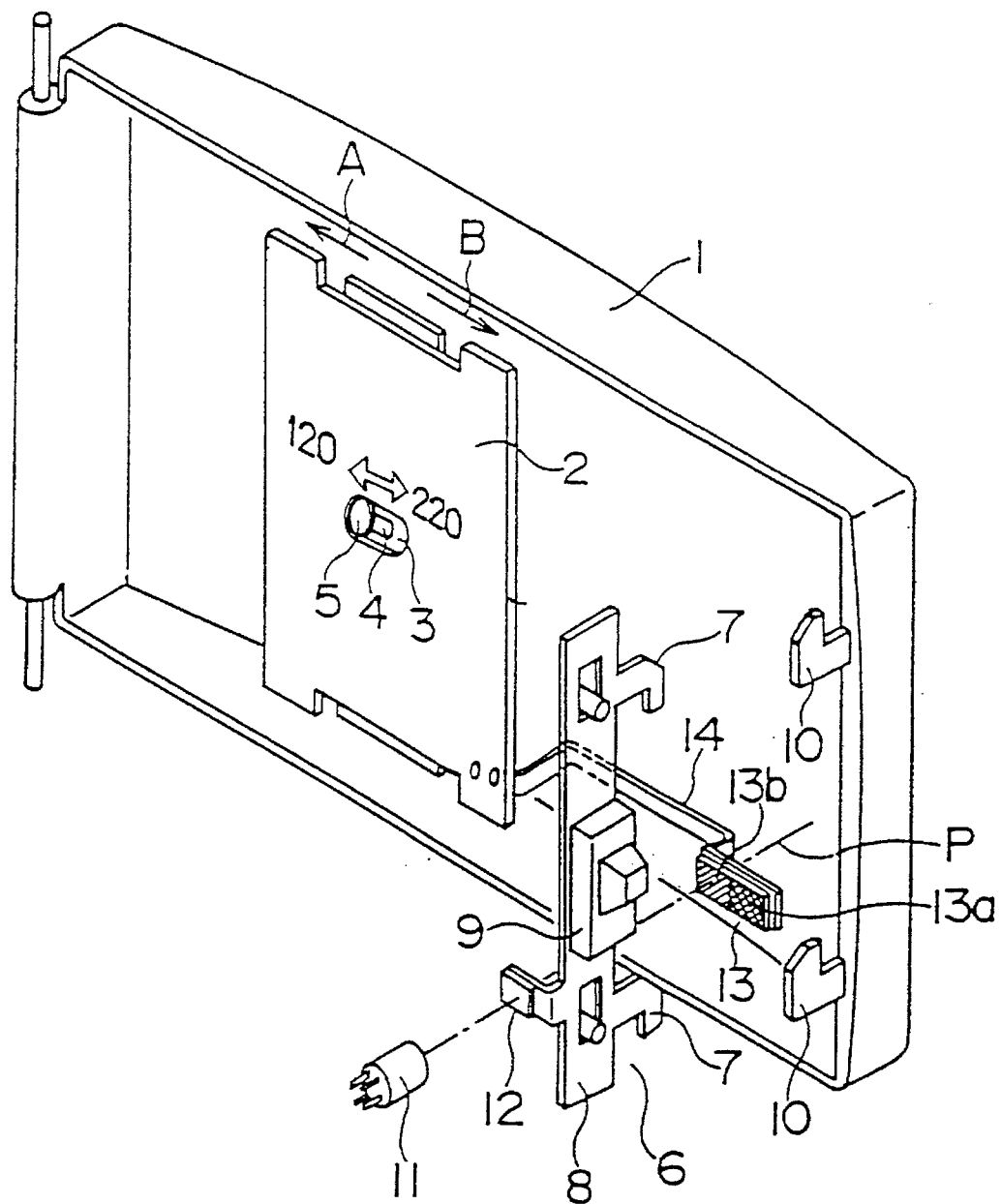
FIG. 1 is a perspective view to show a part of a camera according to the present invention.

The preferred embodiments of the present invention will be described in detail with reference to the accompanying drawings. In the drawings, like or corresponding portions are designated by like reference numerals.

FIG. 1 is a perspective view to show a part of a camera using the Brownie film, which is constructed according to the present invention, omitting the camera body. It should be noted that the term "camera body" in the present specification does not include the back lid.

In FIG. 1, reference numeral 1 designates a back lid of camera and a pressure plate 2 is mounted to a nearly central portion of the back lid 1. A transversely or horizontally extending recess 3 is formed in the central portion of the pressure plate 2, and in addition, an elongated hole 4 extending transversely or horizontally is formed in the center portion. A shank of pin 5 fixed to the back lid 1 is passed through the elongated hole 4 and a head of pin 5 is received in the recess 3. A plate spring (not shown) is set between the pressure plate 2 and the back lid 1, whereby the pressure plate 2 is urged away from the back lid 1. Since the recess 3 is so arranged that the depth of a right portion is different from that of a left portion, the height of the pressure plate 2 to the back lid 1 is changed by horizontally sliding the pressure plate 2 so as to be suitable for the 120 size of roll film or the 220 size of roll film. In the case of the illustrated embodiment, the height of the pressure plate 2 becomes suitable for the 120 size of roll film when the pressure plate is slid in the direction of arrow A; the height of the pressure plate 2 becomes suitable for the 220 size of roll film when the pressure plate 2 is slid in the direction of arrow B.

Further, the camera body (not shown in FIG. 1) is provided with a lock mechanism 6 for locking the back lid 1 in a closed state. This lock mechanism 6 mainly consists of a lock plate 8 having hooks 7. The lock plate 8 can be moved up and down with an operation of a back-lid lock button 9. When the lock plate 8 is located at an up position, the back lid 1 is free to be opened or closed; when the back lid 1 is closed and the lock plate 8 is located at a down position, hooks 10 of the back lid 1 engage with the hooks 7 of the lock plate 8, thereby locking the back lid in the closed state.

Further, a reflection-type photosensor 11 is provided as a detector for detecting the open or close state of the back lid 1. The photosensor 11 is mounted in the camera body, and both a light-emitting portion and a light-receiving portion housed in an outer shell of the photosensor 11, face backward (or are directed in the direction of from the camera body toward the back lid 1).

When the lock mechanism 6 is in the unlock state, i.e., when the lock plate 8 is located at the up position, light emitted from the light-emitting portion of photosensor 11 is reflected by a first reflective plate 12 attached to a projecting portion of the lock plate 8, and reflected light thereof is received by the light-receiving portion. When the lock mechanism 6 is in the lock state and the lock plate 8 is located at the down position, the light emitted from the light-emitting portion of photosensor 11 travels straight above the first reflective plate 12.

A second reflective plate 13 is provided on the side of the back lid 1, and when the back lid 1 is closed, the second reflective plate 13 is located on an optical path P of the light having been emitted from the light-emitting portion of photosensor 11 and having passed above the first reflective plate 12. In the illustrated embodiment, the second reflective plate 13 is provided at a distal end of an elongated plate 14 fixed to the pressure plate 2 at one end thereof and extending horizontally. Accordingly, a reflecting portion for reflecting the light from the photosensor 11 is changed by horizontally sliding the pressure plate 2. A reflecting portion on which the light impinges when the pressure plate 2 is slid in the direction of arrow A is hereinafter referred to as a first reflective portion 13a; a reflecting portion on which the light impinges when the pressure plate 2 is slid in the direction of arrow B is referred to as a second reflective portion 13b.

Reflectivities of the first and second reflective portions 13a, 13b and a reflectivity of the first reflective plate 12 are different from each other and the values of reflectivities can be arbitrarily set. For convenience of description, it is assumed in the following description that the reflectivity of the first reflective plate 12 is 100%, the reflectivity of the first reflective portion 13a is 60%, and the reflectivity of the second reflective portion 13b is 30%.

An output from the photosensor 11 is put into a one-chip type microcomputer mounted in the camera. As described below in detail, the level of the output from photosensor 11 changes nearly in proportion to the intensity of the reflected light received thereby. Thus, analyzing this output, it can be known which reflective plate 12 or 13 has reflected the light and which reflective portion 13a or 13b has reflected the light. Based on the result, the open or close state of the back lid 1 and the type of used roll film can be determined. Further, this microcomputer includes a counter portion for counting a number of taken frames, and the count maximum number to be set upon film loading can be automatically set depending upon the type of the roll film thus determined.

Figure 2A:
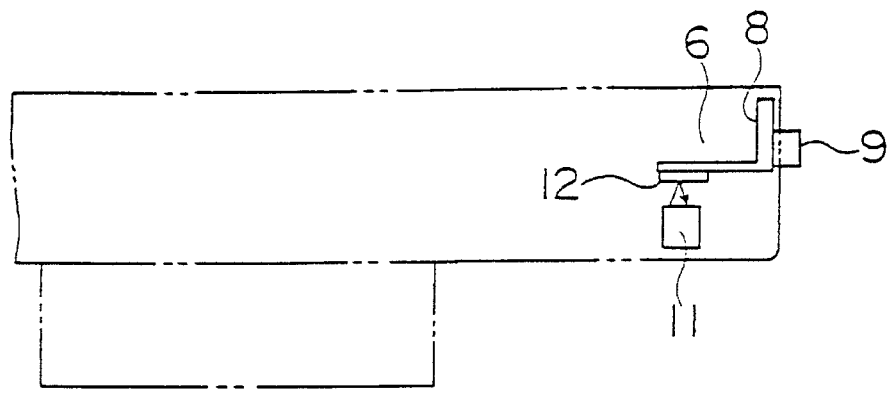
FIG. 2A is an explanatory drawing to show a reflected state of light from the photosensor when the back lid of the camera is open.
Figure 2B:
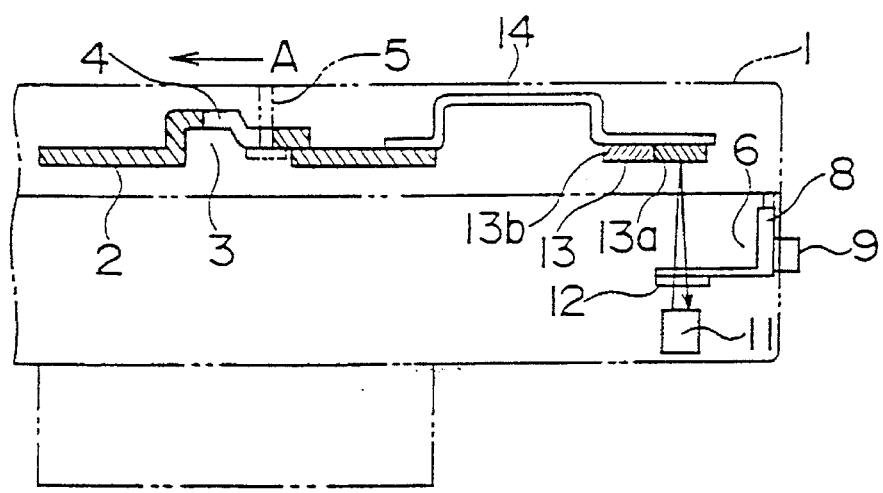
FIG. 2B is an explanatory drawing to show a reflected state of light from the photosensor when the pressure plate is set at a position for 120 size of roll film.
Figure 2C:
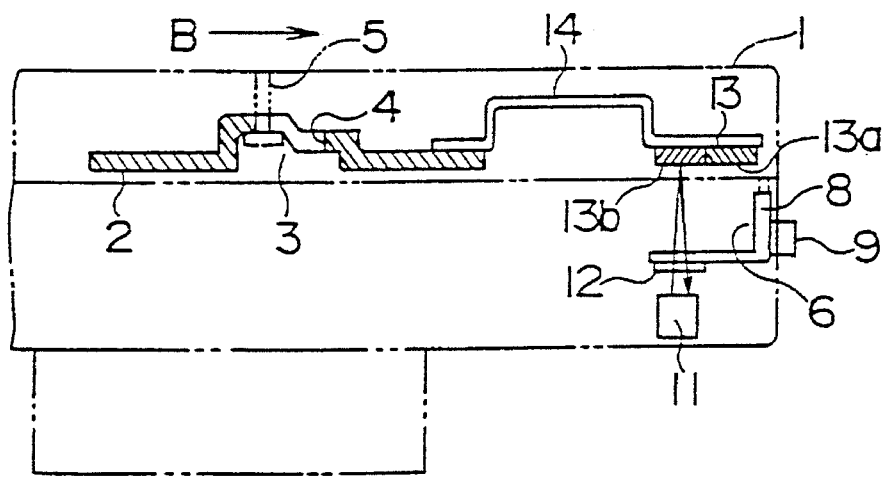
FIG. 2C is an explanatory drawing to show a reflected state of light from the photosensor when the pressure plate is set at a position for 220 size of roll film.

The operation of the present invention is next described in the above-described arrangement with reference to FIG. 2A, FIG. 2B, and FIG. 2C.

First, when the back lid 1 is open and the lock mechanism 6 is in the unlock state, as shown in FIG. 2A, the light from the photosensor 11 is reflected by the first reflective plate 12.

When the back lid 1 is closed and the lock mechanism 6 is in the lock state, as shown in FIG. 2B, the light from the photosensor 11 is reflected by the second reflective plate 13. In FIG. 2B, because the pressure plate 2 is slid in the direction of arrow A for the 120 size of roll film, the light is reflected by the first reflective portion 13a.

Further, because the state of FIG. 2C is the same as FIG. 2B except that the position of the pressure plate 2 is for the 220 size of roll film, the light from the photosensor 11 is reflected by the second reflective portion 13b in the second reflective plate 13.

Figure 3:
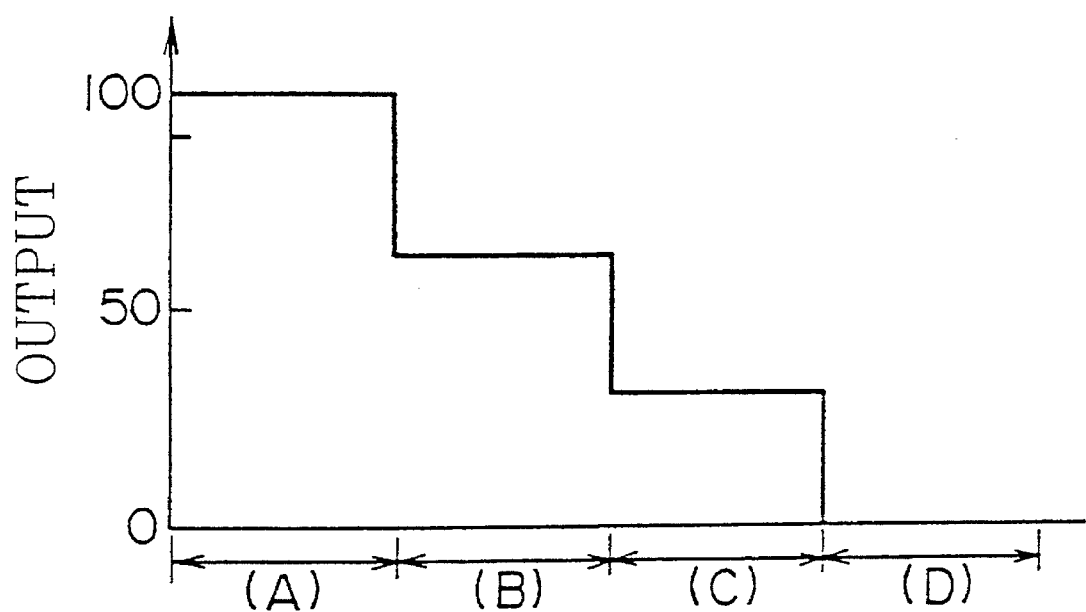
FIG. 3 is a graph to show output levels of the photosensor corresponding to FIG. 2A, FIG. 2B, and FIG. 2C.

FIG. 3 is a graph to show outputs from the photosensor 11 in the above respective cases, wherein regions A, B, and C represent the cases of FIG. 2A, FIG. 2B, and FIG. 2C, respectively. As understood from FIG. 3, because of the differences of reflectivities of the first reflective plate 12 and the reflective portions 13a, 13b in the second reflective plate 13, the output level is 60 in the case of FIG. 2B while it is 30 in the case of FIG. 2C, assuming that the output level of the photosensor 11 is 100 in the case of FIG. 2A. Thus, the microcomputer can determine which state of FIGS. 2A, 2B and 2C is a current circumstance by analyzing the output from the photosensor 11. Since the height of the pressure plate 2 is changed depending upon the type of the used roll film, to detect the height of the pressure plate 2 means to simultaneously detect the type of the used film.

Here, region D in FIG. 3 shows an output level of zero, which represents a case where the lock mechanism 6 is in the lock state though the back lid 1 is open.

Figure 4:
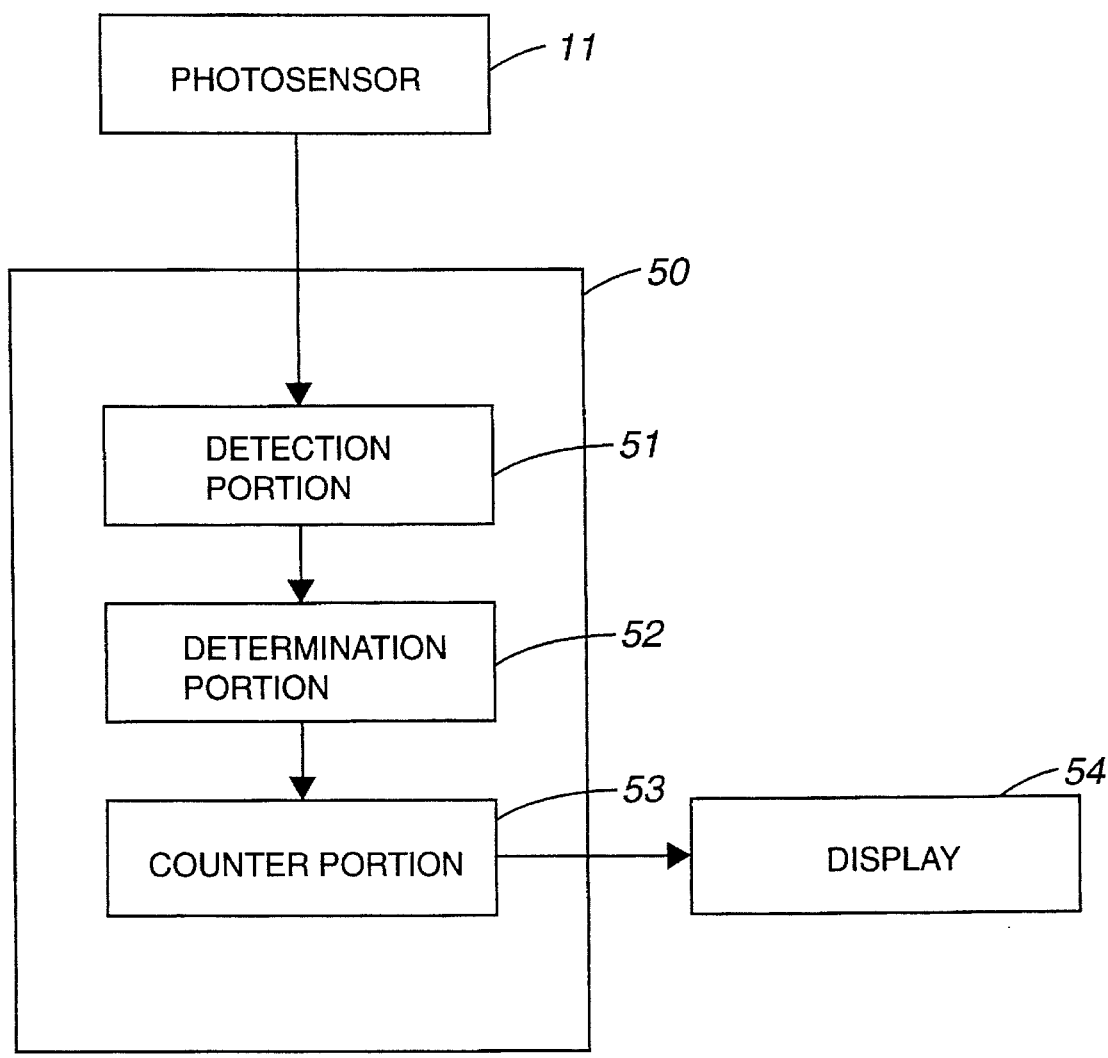
FIG. 4 is a block diagram to functionally show a microcomputer incorporated in the camera according to the present invention.

FIG. 4 is a block diagram to functionally show the microcomputer 50 connected to the photosensor 11. As seen from FIG. 4, a signal from the photosensor 11 is put into a detection portion 51 in the microcomputer 50, where the height of the pressure plate 2 and the open or close state of the back lid 1 are detected as described previously. A result of the detection is put into a determination portion 52, where the type of the used roll film is determined.

Data on the type determined in the determination portion 52 is put into a counter portion 53. The counter portion sets a count maximum number corresponding to the used roll film, based on this data. A display 54 such as a liquid crystal display is connected to the counter portion 53, thereby enabling to function as a normal counter. The display 54 indicates a display value which is counted up one for every exposure. Once the number of taken frames reaches the maximum number set, a predetermined end mark or the like is displayed on the display 54.

The above embodiment is so arranged that information on the type of roll film determined by the microcomputer 50 is used for changeover or setting of the count maximum number, but the information can also be used for other purposes. For example, the information can also be used in such an application that the type of used film is indicated in the liquid crystal display to inform the user of the type.

According to the present invention, as described above, the height of the pressure plate is changed over depending upon the type of the used roll film and then the back lid is closed, whereby the type of the used film can be automatically determined.

In addition, the count maximum number of the counter can be automatically set from the type of the roll film thus determined, which frees the user from an operation of changing the count maximum number through a switch, thereby preventing an error operation. Another advantage is that the counter changeover switch can be obviated.

Japanese Patent Application No. 316823 filed Dec. 16, 1993 in Japan, which is a basis of the present application, is incorporated herein by reference.

What is claimed is:

1. A camera using either one of a 120 size of roll film and a 220 size of roll film, comprising:

a pressure plate mounted to a back lid so that a height thereof to the back lid can be changed depending upon a type of a roll film used;

a lock mechanism provided in a camera body, for locking said back lid in a closed state;

a reflection-type photosensor provided in said camera body;

a first reflective plate provided on a movable portion of said lock mechanism, said first reflective plate being arranged so that when said lock mechanism is in an unlock state, said first reflective plate reflects light emitted from a light-emitting portion of said photosensor, toward a light-receiving portion of said photosensor and so that when said lock mechanism is in a lock state, the first reflective plate lets the light emitted from the light-emitting portion of said photosensor travel straight;

a second reflective plate having first and second reflective portions having respective reflectivities different from each other and from a reflectivity of said first reflective plate, said second reflective plate being mounted to said pressure plate so that when said back lid is closed and said lock mechanism is in the lock state, the second reflective plate reflects the light emitted from the light-emitting portion of said photosensor, toward the light-receiving portion of said photosensor and said second reflective plate being arranged so that a portion reflecting the light from said photosensor is changed over between said first and second reflective portions in synchronization with changeover of the height of said pressure plate;

detecting means for detecting the height of said pressure plate and an open or close state of said back lid in accordance with an output from said photosensor; and determining means for determining the type of the roll film used, from a result of detection by said detecting means.

2. A camera according to claim 1, wherein said lock mechanism comprises a hook fixed to an edge portion of said back lid, a lock plate provided in said camera body so as to be movable between an unlock position and a lock position, and a hook arranged as integral with said lock plate so than when said lock plate is located at the lock position, said hook engages with said hook of said back lid and so that when said lock plate is located at the unlock position, said hook is away from said hook of said back lid; and wherein said first reflective plate is mounted on said lock plate.

3. A camera according to claim 1, wherein said pressure plate is mounted on said back lid so as to be slidable between a position for the 120 size of roll film and a position for the 220 size of roll film.

4. A camera according to claim 1, wherein a reflectivity of said first reflective portion in said second reflective plate is about 60% of a reflectivity of said first reflective plate and a reflectivity of said second reflective portion in said second reflective plate is about 30% of the reflectivity of said first reflective plate.

5. A camera according to claim 1, further comprising;

a counter for counting a number of taken frames; and means for setting in said counter a count maximum number depending upon the type of the roll film determined by said determining means.

* * * * *